United States Patent
Kiyohara et al.

(10) Patent No.: US 9,604,131 B1
(45) Date of Patent: Mar. 28, 2017

(54) SYSTEMS AND METHODS FOR VERIFYING PLAYER PROXIMITY WITHIN A LOCATION-BASED GAME

(71) Applicant: Niantic, Inc., San Francisco, CA (US)

(72) Inventors: Keith Shoji Kiyohara, Santa Monica, CA (US); Chris Hibbert, Mountain View, CA (US); Charles Spirakis, Los Altos, CA (US); James Dinkelacker, Lahaina, HI (US); John V. Hanke, Piedmont, CA (US); Phillip Craig Keslin, San Jose, CA (US)

(73) Assignee: Niantic, Inc., San Francisco, CA (US)

( * ) Notice: Subject to any disclaimer, the term of this patent is extended or adjusted under 35 U.S.C. 154(b) by 211 days.

(21) Appl. No.: 13/955,110

(22) Filed: Jul. 31, 2013

Related U.S. Application Data

(60) Provisional application No. 61/677,615, filed on Jul. 31, 2012.

(51) Int. Cl.
*A63F 13/00* (2014.01)

(52) U.S. Cl.
CPC ...... *A63F 13/00* (2013.01); *A63F 2300/5573* (2013.01)

(58) Field of Classification Search
CPC .......................... A63F 13/12; A63F 2300/5573
USPC ......................................................... 463/42
See application file for complete search history.

(56) References Cited

U.S. PATENT DOCUMENTS

| 6,530,841 | B2 | 3/2003 | Bull et al. |
| 6,811,084 | B2 | 11/2004 | Tatsuta et al. |
| 7,275,994 | B2 | 10/2007 | Eck et al. |
| 7,435,179 | B1* | 10/2008 | Ford .............................. 463/42 |
| 7,491,123 | B2 | 2/2009 | Smith |
| 7,564,469 | B2 | 7/2009 | Cohen |

(Continued)

FOREIGN PATENT DOCUMENTS

| EP | 1574238 | 9/2005 |
| EP | 2101889 | 9/2009 |

(Continued)

OTHER PUBLICATIONS

Matyas, "Playful Geospatial Data Acquisition by Location-Based Gaming Communities", The International Journal of Virtual Reality, 2007, vol. 6, No. 3, pp. 1-10.

(Continued)

*Primary Examiner* — Jason Skaarup
*Assistant Examiner* — Ryan Hsu
(74) *Attorney, Agent, or Firm* — Fenwick & West LLP

(57) ABSTRACT

Systems and methods for verifying player proximity within a location-based game are disclosed. In one aspect, a method for verifying player proximity may include receiving a request associated with verifying the proximity of a first player of the location-based game relative to a second player of the location-based game and transmitting a visual indicator to a first client of the first player, wherein the visual indicator is associated with a data record configured to expire within a predetermined time period. In addition, the method may include receiving a copy of the visual indicator from a second client of the second player and determining whether the copy of the visual indicator was received prior to the expiration of the data record.

10 Claims, 6 Drawing Sheets

(56) References Cited

U.S. PATENT DOCUMENTS

| | | | |
|---|---|---|---|
| 7,740,534 B2* | 6/2010 | Walker | G07F 17/32 273/138.1 |
| 7,946,919 B2 | 5/2011 | Piccionelli | |
| 7,970,749 B2 | 6/2011 | Uhlir et al. | |
| 8,002,617 B1 | 8/2011 | Uskela et al. | |
| 8,070,608 B2 | 12/2011 | Uhlir | |
| 8,108,459 B1 | 1/2012 | Hoffman et al. | |
| 8,190,733 B1 | 5/2012 | Hoffman et al. | |
| 8,267,794 B2 | 9/2012 | Van Luchene | |
| 8,287,383 B1 | 10/2012 | Etter et al. | |
| 8,291,016 B1 | 10/2012 | Whitney et al. | |
| 8,308,568 B2 | 11/2012 | Amaitis et al. | |
| 8,366,446 B2 | 2/2013 | Kreiner et al. | |
| 8,454,441 B2* | 6/2013 | Auterio et al. | 463/42 |
| 8,496,532 B1* | 7/2013 | Bethke et al. | 463/42 |
| 9,220,985 B1* | 12/2015 | Auterio | A63F 13/00 |
| 2001/0009867 A1 | 7/2001 | Sakaguchi et al. | |
| 2002/0090985 A1 | 7/2002 | Tochner et al. | |
| 2003/0036428 A1 | 2/2003 | Aasland | |
| 2003/0224855 A1 | 12/2003 | Cunningham | |
| 2004/0029625 A1 | 2/2004 | Annunziata | |
| 2004/0058732 A1 | 3/2004 | Piccionelli | |
| 2004/0255268 A1 | 12/2004 | Meijer et al. | |
| 2005/0049022 A1 | 3/2005 | Mullen | |
| 2006/0105838 A1 | 5/2006 | Mullen | |
| 2006/0258420 A1 | 11/2006 | Mullen | |
| 2006/0281553 A1 | 12/2006 | Hawkins et al. | |
| 2006/0284789 A1 | 12/2006 | Mullen | |
| 2006/0287026 A1 | 12/2006 | Mullen | |
| 2007/0021166 A1 | 1/2007 | Mattila | |
| 2007/0060408 A1 | 3/2007 | Schultz et al. | |
| 2007/0104348 A1 | 5/2007 | Cohen | |
| 2007/0149284 A1 | 6/2007 | Plavetich et al. | |
| 2007/0281765 A1 | 12/2007 | Mullen | |
| 2007/0281766 A1 | 12/2007 | Mullen | |
| 2008/0015018 A1 | 1/2008 | Mullen | |
| 2008/0015024 A1 | 1/2008 | Mullen | |
| 2008/0039203 A1* | 2/2008 | Ackley et al. | 463/40 |
| 2008/0146338 A1 | 6/2008 | Bernard et al. | |
| 2009/0005140 A1 | 1/2009 | Rose et al. | |
| 2009/0017913 A1* | 1/2009 | Bell | A63F 13/12 463/40 |
| 2009/0024986 A1 | 1/2009 | Meijer et al. | |
| 2009/0281851 A1 | 11/2009 | Newton et al. | |
| 2010/0287011 A1 | 11/2010 | Muchkaev | |
| 2010/0287288 A1 | 11/2010 | Driscoll et al. | |
| 2010/0331089 A1 | 12/2010 | Priebatsch et al. | |
| 2011/0004658 A1 | 1/2011 | Chesley et al. | |
| 2011/0081973 A1 | 4/2011 | Hall | |
| 2011/0319148 A1 | 12/2011 | Kinnebrew et al. | |
| 2012/0040745 A1 | 2/2012 | Auterio et al. | |
| 2012/0052953 A1 | 3/2012 | Annambhotla et al. | |
| 2012/0094770 A1 | 4/2012 | Hall | |
| 2012/0153015 A1* | 6/2012 | Gomez | H04N 21/4126 235/375 |
| 2012/0157210 A1 | 6/2012 | Hall | |
| 2012/0185892 A1 | 7/2012 | Camplejohn et al. | |
| 2012/0190452 A1 | 7/2012 | Weston et al. | |
| 2012/0226627 A1 | 9/2012 | Yang | |
| 2012/0231887 A1 | 9/2012 | Lee et al. | |
| 2012/0233258 A1 | 9/2012 | Vijayaraghavan et al. | |
| 2012/0246104 A1 | 9/2012 | Di Sciullo et al. | |
| 2012/0315992 A1 | 12/2012 | Gerson et al. | |
| 2013/0004932 A1 | 1/2013 | Mahajan et al. | |
| 2013/0005475 A1 | 1/2013 | Mahajan et al. | |
| 2013/0005480 A1 | 1/2013 | Bethke et al. | |
| 2013/0072308 A1 | 3/2013 | Peck et al. | |
| 2013/0085941 A1* | 4/2013 | Rosenblatt | G06Q 20/1085 705/44 |
| 2013/0117326 A1 | 5/2013 | De Smet et al. | |
| 2013/0178257 A1 | 7/2013 | Langseth | |

FOREIGN PATENT DOCUMENTS

| | | |
|---|---|---|
| EP | 2393056 | 12/2011 |
| EP | 2416289 | 2/2012 |
| WO | WO 02/062436 | 8/2002 |

OTHER PUBLICATIONS

Webpage for "Klout Score," 2013, 4 pages, [online] [retrieved on Apr. 1, 2013] Retrieved from the internet <URL:http://klout.com/corp/klout_score>.

Webpage for Empire Avenue, 2009-2013, 1 page, Can be retrieved at <URL:www.empireavenue.com/about/>.

* cited by examiner

SYSTEMS AND METHODS FOR VERIFYING PLAYER PROXIMITY WITHIN A LOCATION-BASED GAME

PRIORITY CLAIMS

The present application is based upon and claims priority to U.S. Provisional Patent Application Ser. No. 61/677,615, entitled "Systems and Methods for Verifying Player Proximity Within a Location-Based Game" and filed on Jul. 31, 2012, which is hereby incorporated herein by reference in its entirety for all purposes.

FIELD

The present disclosure relates generally to location-based gaming, and more particularly, to systems and methods for verifying the proximity of players of a location-based game.

BACKGROUND

Computer-based and/or electronic gaming systems are known that provide a shared virtual environment for many players to interact in a virtual world. With increased availability and connectivity to the Internet, many players from all over the world can interact in the virtual environment and perform various game objectives. Such gaming systems typically do not have a virtual world geography that parallels the real world. Location-based games use the real world as their geography. Some location-based games add virtual locations on a map that parallels the real world geography. Such games, however, are typically focused on real world objectives. These games typically do not include a virtual world that parallels the real world and that acts as a virtual game environment in which many players can interact and perform various game objectives in the virtual world such that player actions in the real world affect game play and/or objectives in the virtual world and vice versa.

In a location-based game having a virtual world that parallels the real world, it may be desirable to verify the proximity of two or more players relative to one another. For instance, the game may reward players that are in close proximity by giving them additional powers, resources, etc. or by allowing them to achieve game objectives.

SUMMARY

Aspects and advantages of embodiments of the invention will be set forth in part in the following description, or may be obvious from the description, or may be learned through practice of the embodiments.

In one aspect, the present subject matter is directed to a computer-implemented method for verifying player proximity within a location-based game. The method may generally include receiving a request associated with verifying the proximity of a first player of the location-based game relative to a second player of the location-based game and transmitting a visual indicator to a first client of the first player, wherein the visual indicator is associated with a data record configured to expire within a predetermined time period. In addition, the method may include receiving a copy of the visual indicator from a second client of the second player and determining whether the copy of the visual indicator was received prior to the expiration of the data record.

In another aspect, the present subject matter is directed to a computer-implemented method for verifying player proximity within a location-based game. The method may include receiving a first signal from a first client of a first player of the location-based game, wherein the first signal is associated with a location of the first client and a time at which the first client was at the location. In addition, the method may include a receiving a second signal from a second client of a second player of the location-based game, wherein the second signal is associated with a location of the second client and a time at which the second client was at the location. Moreover, the method may include determining if the first signal is the same as the second signal.

Other exemplary implementations of the present disclosure are directed to systems, apparatus, non-transitory computer-readable media, devices, user interfaces and other methods for verifying player proximity within a location-based game.

These and other features, aspects and advantages of the various embodiments will become better understood with reference to the following description and appended claims. The accompanying drawings, which are incorporated in and constitute a part of this specification, illustrate embodiments of the invention and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
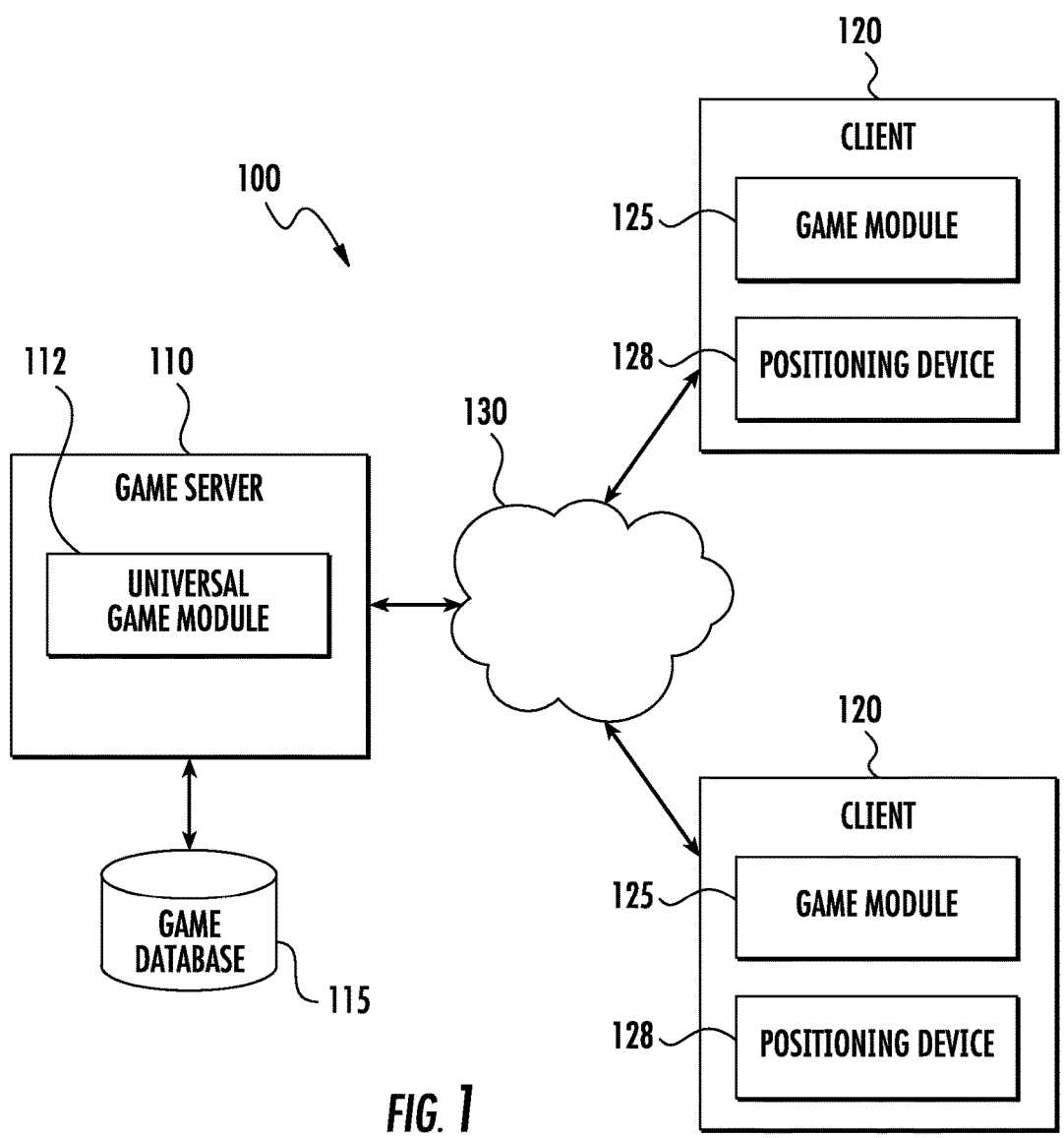
FIG. 1 depicts an exemplary computer-based system for implementing a location-based game according to an exemplary embodiment of the present disclosure.

Reference now will be made in detail to embodiments of the invention, one or more examples of which are illustrated in the drawings. Each example is provided by way of explanation of embodiments, not limitation of the invention. In fact, it will be apparent to those skilled in the art that various modifications and variations can be made to embodiments without departing from the scope or spirit of the invention. For instance, features illustrated or described as part of one embodiment can be used with another embodiment to yield a still further embodiment. Thus, it is intended that the present subject matter covers such modifications and variations as come within the scope of the appended claims and their equivalents.

Overview

In general, the present subject matter is directed to systems and methods for verifying the proximity of players of a location-based game, such as a parallel reality game having a virtual world geography that parallels the real world geography. According to one aspect of the present subject matter, a visual method may be used to verify the proximity of one player to another. Specifically, in several embodiments, a game server may transmit a unique visual indicator (e.g., a QR code) to a first player, which may then be shared with a second player. The second player may then create a copy of the visual indicator (e.g., by taking a picture of the visual indicator) and upload the copy to the game server. If the copy of the visual indicator is received by the game server within a specified period of time (e.g., before a data record associated with the visual indicator expires), it can be assumed that the two players are in close proximity.

According to another aspect of the present subject matter, the proximity of two or more players may be verified using location/time-dependent signals. For instance, in several embodiments, the location/time-dependent signals may be unique, time variant wireless signals (e.g., WiFi signals, Bluetooth signals, etc.). In such embodiments, a wireless beacon may transmit the wireless signals across a limited distance or range. Thus, if two players are both within the range of the wireless beacon, they may receive the same unique signal and upload it to the server, thereby providing an indication that the players were at the same location at the same time. In another embodiment, the location/time-dependent signals may be unique audio profiles recorded at the same proximate location. For instance, two players in close proximity may take audio recordings of the ambient noise around them. If the audio profiles for the recordings are the same, it can be assumed that the players were at the same location when the recordings were captured.

Exemplary Location-Based Gaming System

Exemplary computer-implemented location-based gaming systems according to exemplary embodiments of the present disclosure will now be set forth. The present subject matter will be discussed with reference to a parallel reality game. A parallel reality game is a location-based game having a virtual world geography that parallels at least a portion of the real world geography such that player movement and actions in the real world affect actions in the virtual world and vice versa. Those of ordinary skill in the art, using the disclosures provided herein, should understand that the subject matter of the present disclosure is equally applicable to other gaming systems. In addition, the inherent flexibility of computer-based systems allows for a great variety of possible configurations, combinations, and divisions of tasks and functionality between and among the components of the system. For instance, the systems and methods for modifying or verifying game data according to aspects of the present disclosure can be implemented using a single computing device or across multiple computing devices.

FIG. 1 illustrates an exemplary computer-implemented location-based gaming system 100 configured in accordance with an embodiment of the present disclosure. The location-based gaming system 100 provides for the interaction of a plurality of players in a virtual world having a geography that parallels the real world. In particular, a geographic area in the real world can be linked or mapped directly to a corresponding area in the virtual world. A player can move about in the virtual world by moving to various geographic locations in the real world. For instance, the system 100 can track a player's position in the real world and update the player's position in the virtual world based on the player's current position in the real world.

Figure 2:
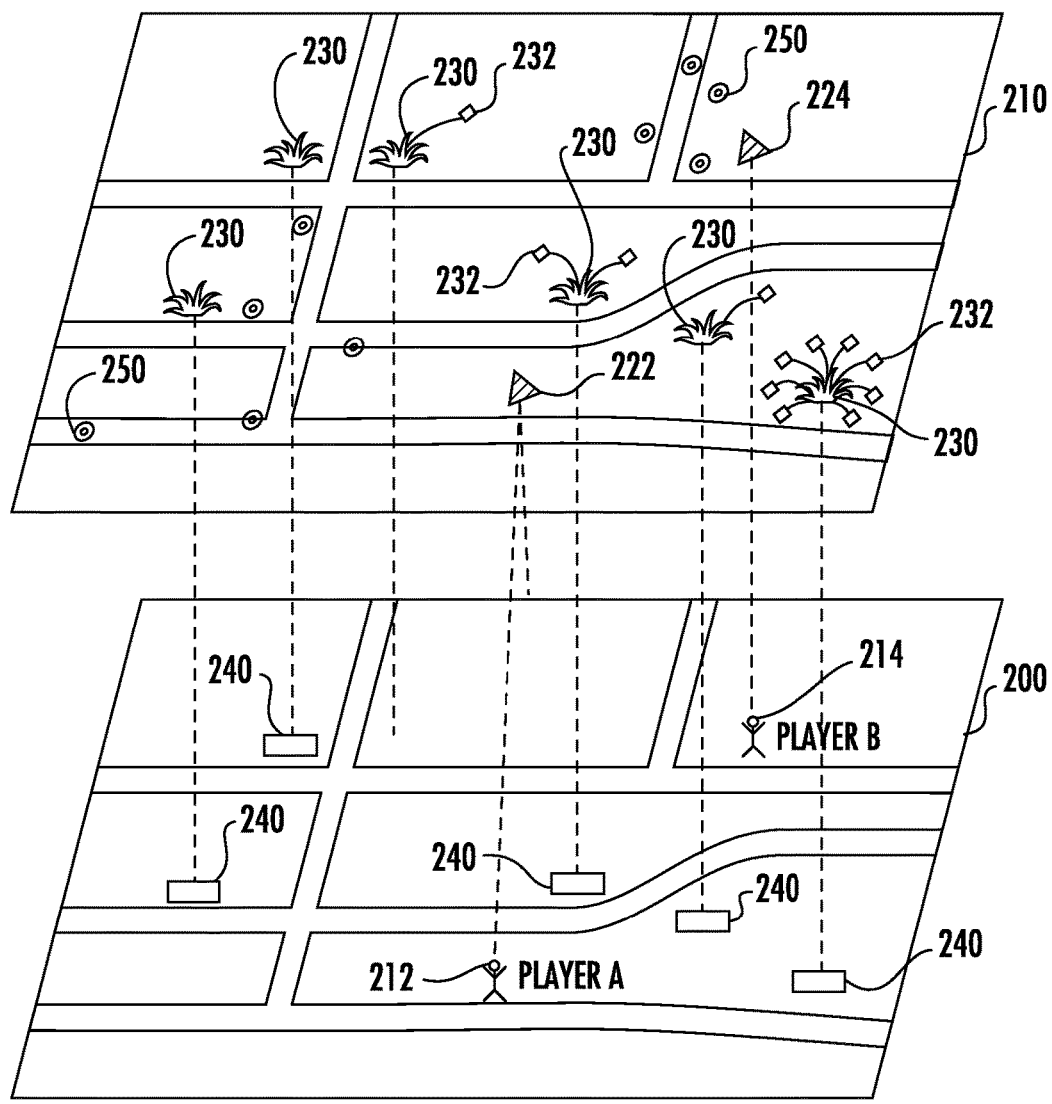
FIG. 2 depicts a representation of a virtual world having a geography that parallels the real world.

FIG. 2 depicts a conceptual diagram of a virtual world 210 that parallels the real world 200 that can act as the game board for all players of a location-based game according to an exemplary embodiment of the present disclosure. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, a positioning system associated with a mobile device carried by the player (e.g. a GPS system) can be used to track a player's position as the player navigates the range of geographic coordinates in the real world. Data associated with the player's position in the real world 200 is used to update the player's position in the corresponding range of coordinates defining the virtual space in the virtual world 210. In this manner, players can navigate a continuous track in the range of coordinates defining the virtual space in the virtual world 210 by simply traveling among the corresponding range of geographic coordinates in the real world 200 without necessarily having to check in or periodically update location information at specific discrete locations in the real world 200.

The location-based game can include a plurality of game objectives requiring players to travel to and/or interact with various virtual elements and/or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements and/or objects at the specific location to achieve or perform one or more game objectives.

For example, referring to FIG. 2, a game objective can require players to capture or claim ownership of virtual elements 230 located at various virtual locations in the virtual world 210. These virtual elements 230 can be linked to landmarks, geographic locations, or objects 240 in the real world 200. The real world landmarks or objects 240 can be works of art, monuments, buildings, businesses, libraries, museums, or other suitable real world landmarks or objects. To capture these virtual elements 230, a player must travel to the landmark or geographic location 240 linked to the virtual elements 230 in the real world and must perform any necessary interactions with the virtual elements 230 in the virtual world 210. For example, player A of FIG. 2 will have to travel to a landmark 240 in the real world 200 in order to interact with or capture a virtual element 230 linked with that particular landmark 240. The interaction with the virtual element 230 can require action in the real world, such as taking a photograph and/or verifying, obtaining, or capturing other information about the landmark or object 240 associated with the virtual element 230. In addition, interaction with a virtual element 230 may also require that two or more players be located in close proximity to a landmark 240 linked with that particular virtual element 230.

Game objectives can require that players use one or more virtual items that are collected by the players in the location-based game. For instance, the players may have to travel the virtual world seeking virtual items (e.g. weapons or other items) that can be useful for completing game objectives. These virtual items can be found or collected by traveling to different locations in the real world or by completing various actions in either the virtual world or the real world. In the example shown in FIG. 2, a player uses virtual items 232 to capture one or more virtual elements 230. In particular, a player can deploy virtual items 232 at locations in the virtual world 210 proximate the virtual elements 230. Deploying one or more virtual items 232 proximate a virtual element 230 can result in the capture of the virtual element 230 for the particular player or for the team and/or faction of the particular player.

In one particular implementation, a player may have to gather virtual energy as part of the location-based game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items and/or to perform various game objectives in the game. A player that loses all virtual energy 250 can be disconnected from the game.

According to aspects of the present disclosure, the location-based game can be a massive multi-player location-based game where every participant in the game shares the same virtual world. The players can be divided into separate teams or factions and can work together to achieve one or more game objectives, such as to capture or claim ownership of a virtual element. In this manner, the location-based game can intrinsically be a social game that encourages cooperation among players within the game. Players from opposing teams can work against each other during the location-based game. A player can use virtual items to attack or impede progress of players on opposing teams.

The location-based game can have various features to enhance and encourage game play within the location-based game. For instance, players can accumulate a virtual currency or other virtual reward that can be used throughout the game. Players can advance through various levels as the players complete one or more game objectives and gain experience within the game. Players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the location-based game without deviating from the scope of the present disclosure.

Referring back FIG. 1, the computer-implemented location-based gaming system 100 will be discussed in more detail. The system 100 can include a client-server architecture, where a game server 110 communicates with one or more clients 120 over a network 130. Although two clients 120 are illustrated in FIG. 1, any number of clients 120 can be connected to the game server 110 over the network 130.

The server 110 can host a universal gaming module 112 that controls aspects of the location-based game for all players and receives and processes each player's input in the location based game. On the client-side, each client 120 can include a gaming module 125 that operates as a gaming application so as to provide a user with an interface to the system 100. The game server 110 transmits game data over the network 130 to the client 120 for use by the gaming module 125 at the client 120 to provide local versions of the game to players at locations remote from the game server 110.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM hard disk or optical or magnetic media.

The game server 110 can be any computing device and can include a processor and a memory. The memory can store instructions which cause the processor to perform operations. The game server 110 can include or can be in communication with a game database 115. The game database 115 stores game data used in the location-based game to be served or provided to the client(s) 120 over the network 130.

The game data stored in the game database 115 can include: (1) data associated with the virtual world in the location-based game (e.g. imagery data used to render the virtual world on a display device, geographic coordinates of locations in the virtual world, etc.); (2) data associated with players of the location-based game (e.g. player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real world objects, landmarks, positions linked to virtual world elements (e.g. location of real world objects/landmarks, description of real world objects/landmarks, relevance of virtual elements linked to real world objects, etc.); (6) Game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the location-based game. The game data stored in the game database 115 can be populated either offline or in real time by system administrators and/or by data received from users/players of the system 100, such as from one or more clients 120 over the network 130.

The game server 110 can be configured to receive requests for game data from one or more clients 120 and to respond to those requests via the network 130. For instance, the game server 110 can encode game data in one or more data files and provide the data files to the client 120. In addition, the game server 110 can be configured to receive game data (e.g. player positions, player actions, player input, etc.) from one or more clients 120 via the network 130. For instance, the client device 120 can be configured to periodically send player input and other updates the game server 110, which the game server 110 uses to update game data in the game database 115 to reflect any and all changed conditions for the game.

As illustrated, the game server 110 can include a universal game module 112. The universal game module 112 hosts the location-based game for all players and acts as the authoritative source for the current status of the location-based game for all players. The universal game module 112 receives game data from clients 120 (e.g. player input, player position, player actions, landmark information, etc.) and incorporates the game data received into the overall location-based game for all players of the location-based game. The universal game module 112 can also manage the delivery of game data to the clients 120 over the network 130.

Other modules can be used with the game server 110. Any number of modules can be programmed or otherwise configured to carry out the server-side functionality described herein. In addition, the various components on the server-side can be rearranged. For instance, the game database 115 can be integrated into the game server 110. Other configurations will be apparent in light of this disclosure and the present disclosure is not intended to be limited to any particular configuration.

A client 120 can be any portable computing device that can be used by a player to interface with the gaming system 100. For instance, a client 120 can be a wireless device, a personal digital assistant (PDA), portable gaming device, cellular phone, smart phone, tablet, navigation system, handheld GPS system or other such device. In short, a client 120 can be any computer-device or system that can execute a gaming module 125 to allow a player to interact with the game system 100.

The client 120 can include a processor and a memory. The memory can store instructions which cause the processor to perform operations. The client 120 can include various input/output devices for providing and receiving information from a player, such as a display screen, touch screen, touch pad, data entry keys, speakers, and/or a microphone suitable for voice recognition. The client 120 can further include a network interface for providing communications over the network 130.

The gaming module 125 executed by the client 120 provides an interface between a player and the location-based game. The gaming module 125 can present a user interface on a display device associated with the client 120 that displays a virtual world associated with the game and allows a user to interact in the virtual world to perform various game objectives. The gaming module 125 can also control various other outputs to allow a player to interact with the game without requiring the player to view a display screen. For instance, the gaming module 125 can control various audio, vibratory, or other notifications that allow the player to play the game without looking at the display screen. The gaming module 125 can access game data received from the game server 110 to provide an accurate representation of the game to the user. The gaming module 125 can receive and process player input and provide updates to the game server 110 over the network 130.

Because the gaming system 100 is for a location-based game, the client 120 is preferably a portable computing device, such as a smartphone or other portable device, that can be easily carried or otherwise transported with a player. A player can interact with the virtual world simply by carrying or transporting the client 120 in the actual world. The client 120 can include a positioning device 128 that monitors the position of a player during game play. The positioning device 128 can be any device or circuitry for monitoring the position of the client 120. For example, the positioning device 128 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or wifi hotspots, and/or other suitable techniques for determining position.

As the player moves around with the client 120 in the real world, the positioning device 128 tracks the position of the player and provides the player position information to the gaming module 125. The gaming module 125 updates the player position in the virtual world associated with the game based on the actual position of the player in the real world. In particular, the location of the player in the virtual world can correspond to the location of the player in the real world. The gaming module 125 can provide player position information to the game server 110 over the network 130 such that the universal gaming module 112 keeps track of all player positions throughout the game. It should be understood that location information associated with a player is utilized only if permission is granted after the player has been notified that location information of the player is to be accessed and how the location information is to be utilized in the context of the game (e.g. to update player position in the virtual world). In addition, any location information associated with players will be stored and maintained in a manner to protect player privacy.

The network 130 can be any type of communications network, such as a local area network (e.g. intranet), wide area network (e.g. Internet), or some combination thereof. The network can also include a direct connection between a client 120 and the game server 110. In general, communication between the game server 110 and a client 120 can be carried via a network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

Figure 3:
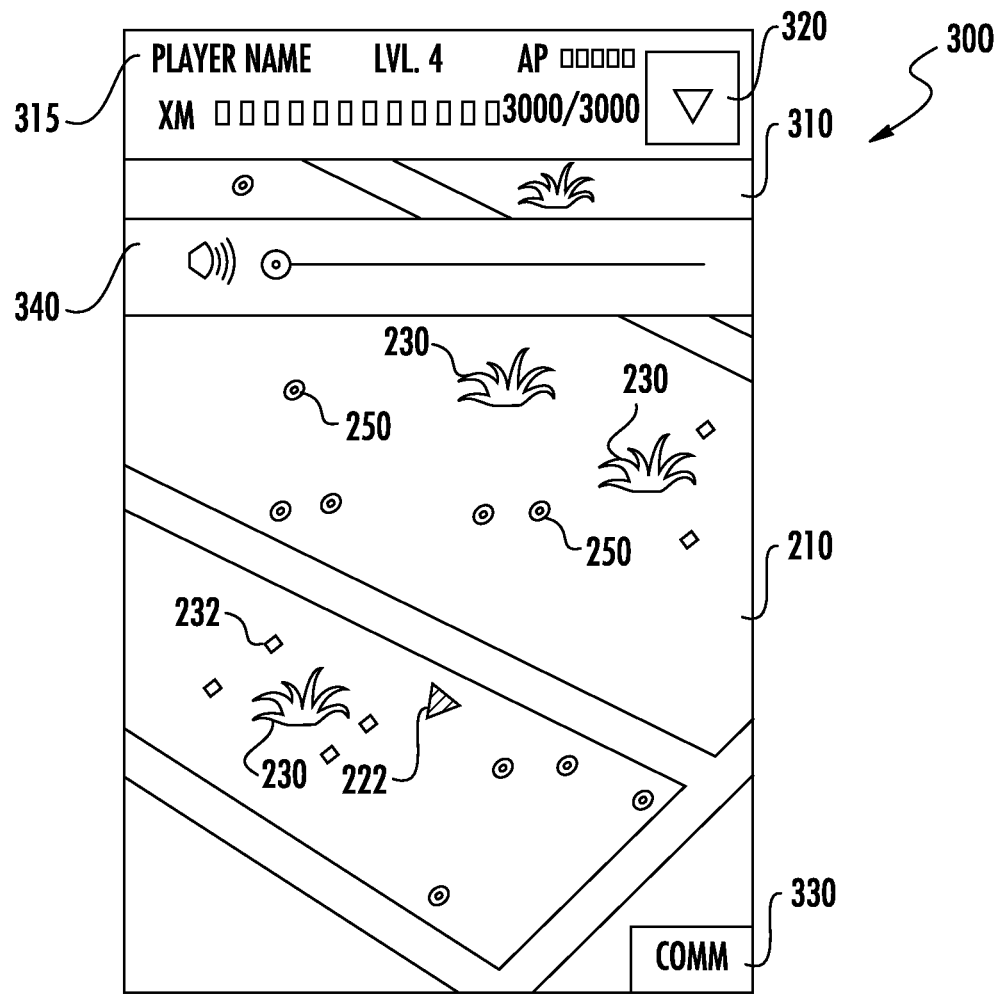
FIG. 3 depicts an exemplary game interface of a location-based game according to an exemplary embodiment of the present disclosure.

In addition, in situations in which the systems and methods discussed herein access and analyze personal information about users, or make use of personal information, such as location information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user Exemplary Game Interface FIG. 3 depicts one particular embodiment of a game interface 300 that can be presented on a display of a client 120 as part of the interface between a player and the gaming system 100. The game interface 300 includes a display window 310 that can be used to display the virtual world 210 and various other aspects of the game, such as player position 212 and the locations of virtual elements 230, virtual items 232 and virtual energy 250 in the virtual world 210. The user interface 300 can also display other information, such as game data information, game communications, player information, and other information associated with the game. For example, the user interface can display player information 315, such as player name, experience level and other information. The user interface 300 can include a menu 320 for accessing various game settings and other information associated with the game. The user interface 300 can also include a communications interface 330 that enables communications between the game system and the player and between one or more players of the location-based game.

According to aspects of the present disclosure, a player can interact with the location-based game by simply carrying a client device around in the real world. For instance, a player can play the location-based game by simply accessing an application associated with the location based game on a smartphone and moving about in the real world with the smartphone. In this regard, it is not necessary for the player to continuously view a visual representation of the virtual world on a display screen in order to play the location based game. As a result, the user interface 300 can include a plurality of non-visual elements that allow a user to interact with the game. For instance, the game interface can provide audible notifications to the player when the player is approaching a virtual element or object in the game or when an important event happens in the location-based game. A player can control these audible notifications with audio control 340. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, should understand that numerous game interface configurations and underlying functionalities will be apparent in light of this disclosure. The present disclosure is not intended to be limited to any one particular configuration.

Verifying Player Proximity within a Location-Based Game

As indicated above, the present subject matter is generally directed to systems and methods for verifying the proximity of players of a location-based game, such as the game described above with reference to FIGS. 1-3. Such verification of the proximity of players may be required for game objectives to be completed and/or for specific items/elements to be captured or obtained. For instance, referring back to FIG. 2, to capture or claim ownership of a virtual element 230 within the virtual world 210, it may be necessary for two or more players to be located proximate to the corresponding location 240 in the real world 200 at the same time. Similarly, two or more players associated with the same team or faction may be provided the opportunity to gain additional items, energy, currency, experience points and/or the like by verifying that they are positioned at a particular location at the same time.

Figure 4:
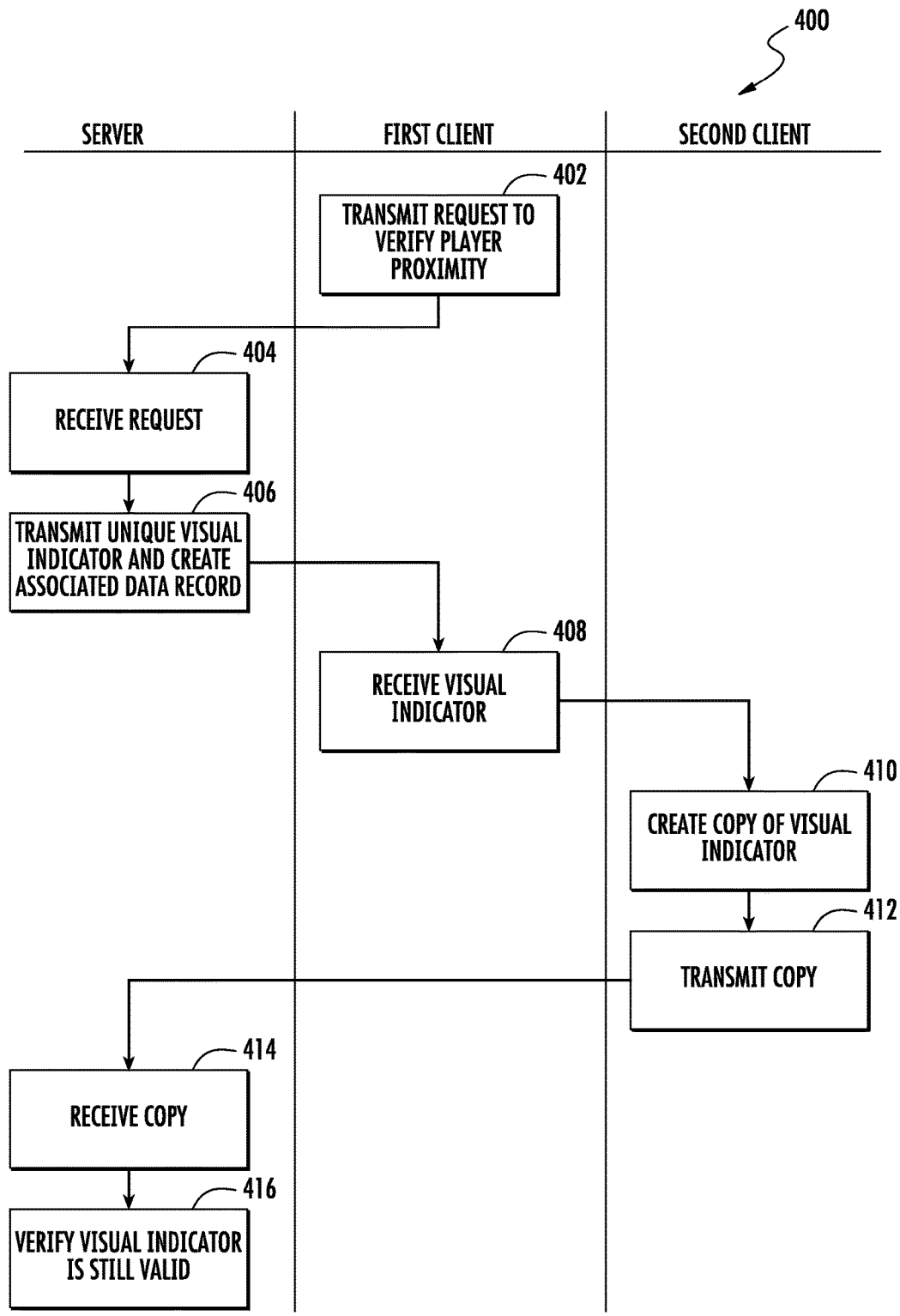
FIG. 4 depicts a server-client flow diagram of one embodiment of a method for verifying player proximity within a location-based game.

Referring now to FIG. 4, a server-client flow diagram of one embodiment of a method 400 for verifying the proximity of players of a location-based game is illustrated in accordance with aspects of the present subject matter. As shown, the method 400 will generally be described with reference to verifying the proximity of a first player having a first client (e.g., client 120 of FIG. 1) relative to a second player having a second client (e.g., client 120 of FIG. 1). However, it should be appreciated that the disclosed method 400 may generally be used to verify the proximity of any number of players of a location-based game.

At 402, the first client may transmit a request to the server (e.g., game server 110 of FIG. 1) to verify the proximity of the first client/player to the second client/player. For instance, the first player may desire to "team-up" with the second player within the game, which may require that both players be in close proximity to one another. In such case, the first player may provide an input to the first client indicating this desire, such as by pressing a "team-up" button displayed on a user interface of the first client (e.g., game interface 300 of FIG. 3) and/or by providing any other suitable input. In response to such input, the first client may then transmit the request to the server to verify the proximity of the first and second players. In addition to "teaming-up" with another player, requests to verify the proximity of two or more players can be transmitted to the server for any other suitable reason. For example, as indicated above, game objectives may be completed and/or rewards may be obtained by verifying the proximity of two or more players.

At 404, the server may receive the request from the first client and, at 406, may transmit a response to the first client including a unique visual indicator. In general, the visual indicator may correspond to a unique image, code, pattern and/or any other suitable visual display that may be used by the server to verify the proximity of two or more players. For instance, in one embodiment, the visual indicator may be a quick response (QR) code containing a globally unique serial number. In other embodiments, the visual indicator may be any other unique barcode or any other suitable indicator, such as a unique pattern of colors, letters and/or numbers or a unique picture. It should be appreciated that the visual indicator may be randomly generated by the server or may be selected from a plurality of visual indicators pre-stored on the server's memory.

In addition, at 406, the server may also create and store a data record that is linked to or otherwise associated with the visual indicator. For instance, the data record may include a copy of the visual indicator, player information regarding the first player, a timestamp corresponding to the time at which the visual indicator was transmitted to the first client and/or any other suitable information. In addition, to allow for the proximity of the first and second players to be verified, the data record may be set to expire within a predetermined amount of time (e.g., thirty seconds) after the visual indicator is transmitted to the first client. In several embodiments, this predetermined amount of time may be selected so as to generally correspond to the amount of time required for the first player to share the visual indicator with another player(s) in his/her immediate proximity without providing the first player sufficient time to share the visual indicator with another player(s) that is not in his/her immediate proximity (e.g., by sending the visual indicator via text message or email).

Once the visual indicator is received by the first client (at 408), the first player may share the visual indicator with the second player. For instance, upon receipt, the visual indicator may be displayed on the display device of the first client, thereby allowing the first player to show the visual indicator to the second player. The second player may then, at 410, create a copy of the visual indicator on the second client. For example, in embodiments in which the second client is a smart phone or any other device including a camera, the second player may take a picture of the visual indicator displayed on the first client. In another embodiment, the second player may create a copy of the visual indicator using any other suitable method, such as by manually generating the visual indicator on the second client (e.g., by typing or drawing the visual indicator on the second client).

Referring still to FIG. 4, at 412, the second client may transmit the copy of the visual indicator to the server. For instance, in one embodiment, the copy of the visual indicator may be created within or uploaded into the game module of the second client (e.g., game module 125 of FIG. 1). In such an embodiment, the second player may simply provide a suitable input (e.g., by pressing a button displayed on the game interface 300 (FIG. 3)) to transmit the copy of the visual indicator to the server via the game module.

At 414, the server may receive the copy of the visual indicator and, at 416, may verify that the visual indicator is still valid. Specifically, as indicated above, the visual indicator may be associated with a data record having a predetermined expiration date/time. Thus, upon receipt of the copy of the visual indicator, the server may initially determine which data record is associated with the copy. For instance, in embodiments in which the visual indicator is a QR code, the server may decode the QR code and link the copy of visual indicator to the appropriate data record. The server may then determine whether the copy of the visual indicator was received prior to the expiration of the data record. If so, it may be assumed that the first and second players are in close proximity and, thus, the server may verify their proximity within the game.

Additionally, in several embodiments, the expiration period for the visual indicator may be extended after verification of the second player's proximity to the first player to allow for the proximity of additional players to be verified. Specifically, after the server verifies the validity of the copy of the visual indicator transmitted by the second client, the server may extend the expiration period for an additional period of time (e.g., an additional 30 seconds). Such extension of the expiration period may allow for the first player and/or the second player to share the visual indicator with additional players in their proximity. For instance, a third player may create a copy of the visual indicator displayed on the first client while a fourth player may create a copy of the visual indicator displayed on the second client. The third and fourth players may then transmit the copies of the visual indicator to the server prior to the expiration of the extended time period to verify their proximity to the first and second players. It should be appreciated that this process may be repeated such that, for each successful verification of the visual indicator from a new player, the expiration period may be extended to allow for the proximity of additional players to be verified.

Moreover, in alternative embodiments, the visual indicator may be displayed on a computing device other than the clients used by the players. For instance, a computing device may be positioned at a particular location in the real world (e.g., at a particular landmark or retail location) and may be configured to display a unique visual indicator that can be viewed by players in close proximity to the computing device. For example, the computing device may be configured to display a visual indicator that updates or changes at a given frequency (e.g., every thirty seconds). In such an embodiment, the players viewing the visual indicator (e.g., the first and second players) may create a copy of the visual indicator on their respective clients and transmit the copies to the server. If the players transmit the same visual indicator to the server, it may be assumed that the players were in close proximity to the computing device at the same time.

Figure 5:
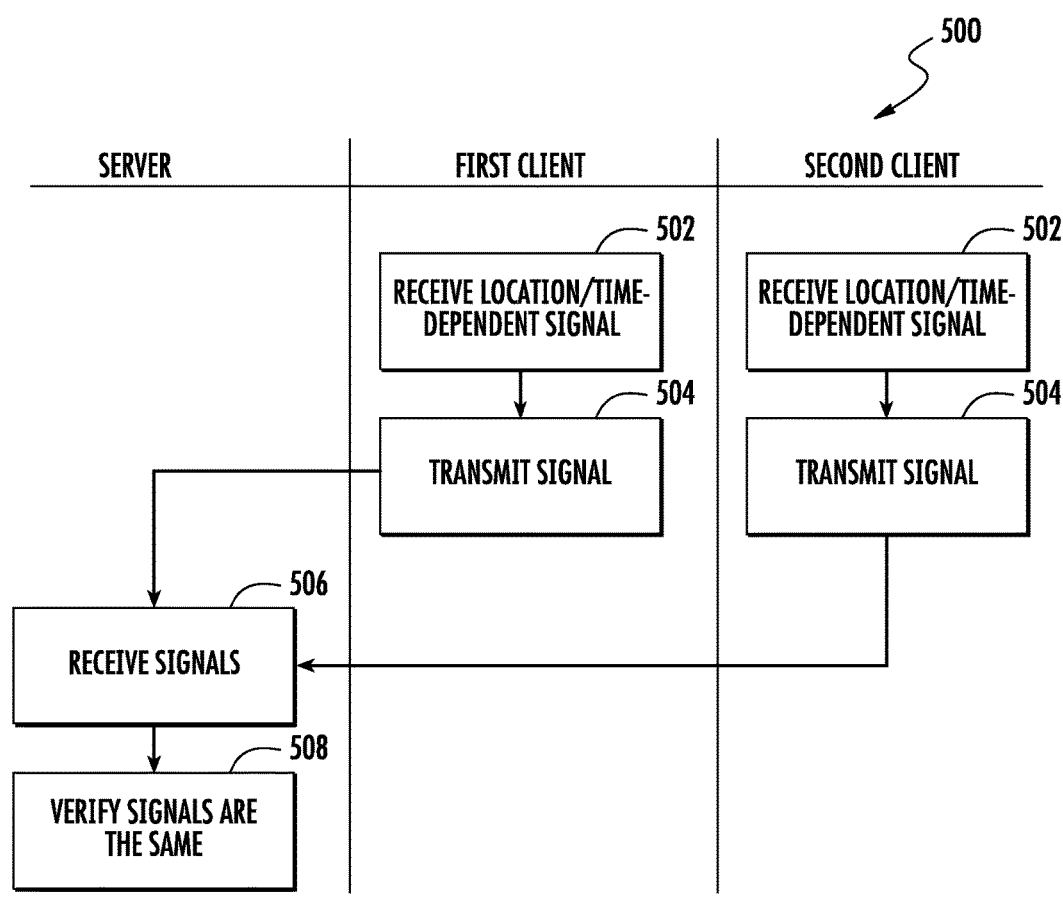
FIG. 5 depicts a server-client flow diagram of another embodiment of a method for verifying player proximity within a location-based game.

Referring now to FIG. 5, a server-client flow diagram of another embodiment of a method 500 for verifying the proximity of players of a location-based game is illustrated in accordance with aspects of the present subject matter. As shown, the method 500 will generally be described with reference to verifying the proximity of a first player having a first client (e.g., client 120 of FIG. 1) relative to a second player having a second client (e.g., client 120 of FIG. 1). However, it should be appreciated that the disclosed method 500 may generally be used to verify the proximity of any number of players of a location-based game.

At 502, both the first and second clients may receive a location/time-dependent signal. As used herein, the term "location/time-dependent signal" refers to a unique signal that may only be received by a client within a limited distance from the origination point of the signal and within a limited amount of time. For instance, as will be described below, in one embodiment, the location/time-dependent signal may be a unique, time-variant wireless signal that is transmitted by a wireless beacon across a limited range. In another embodiment, the location/time-dependent signal may be a unique audible signal originating from a noise source at a given point in time.

Referring still to FIG. 5, at 504, the location/time-dependent signals may be transmitted from the first and second clients to the server (e.g., game server 110 of FIG. 1). For instance, in one embodiment, the location/time-dependent signals may be received by or uploaded into the game modules of the first and second clients (e.g., game modules 125 of FIG. 1). In such an embodiment, the first and second players may simply provide suitable inputs to their respective clients (e.g., by pressing a button displayed on the game interface 300 (FIG. 3)) to transmit copies of the location/time-dependent signals to the server via the game modules.

At 506, the server may receive the location/time-dependent signals and, at 508, may verify that the location/time-dependent signal received from the first client is same as the location/time dependent signal received from the second client. Given the nature of such signals, if the location/time-dependent signals are the same, it can be assumed that the first and second players were at the same proximal location at the time the signals were received. The server may then verify the proximity of the first and second players within the game.

Figure 6:
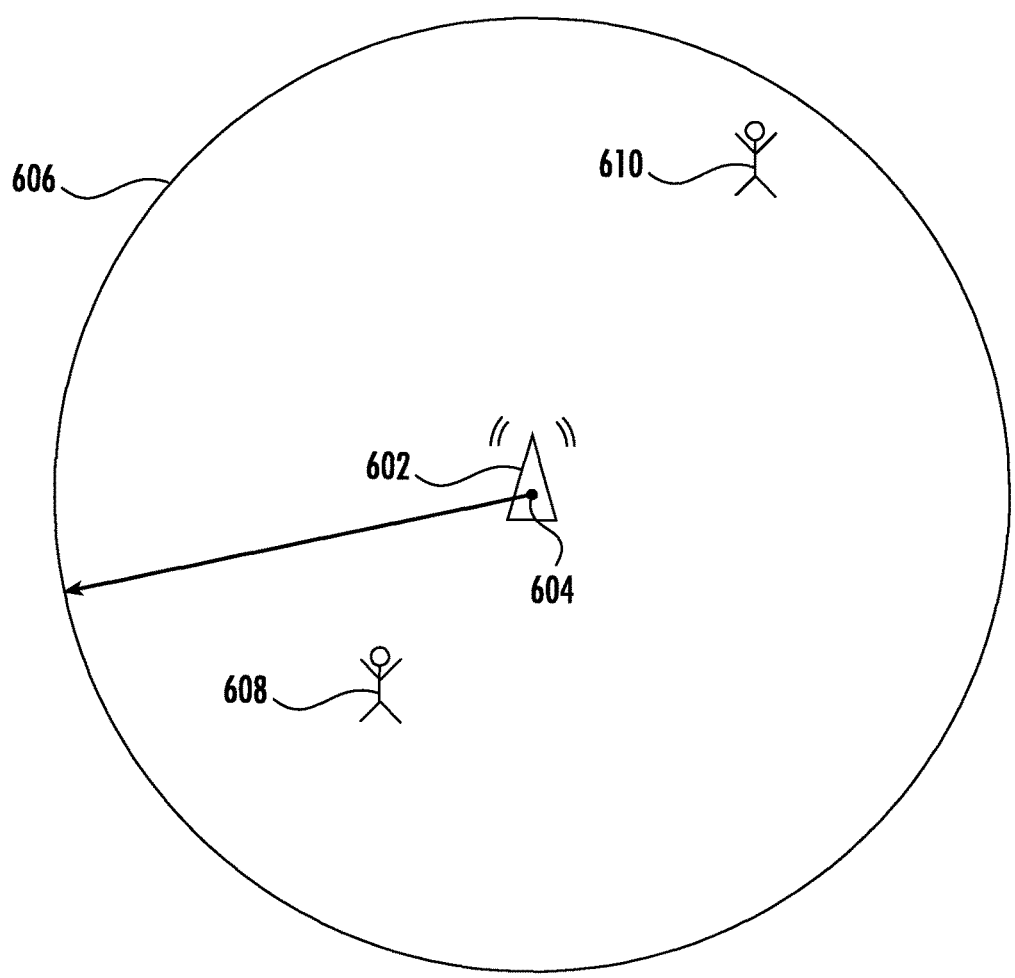
FIG. 6 depicts a simplified schematic diagram of one exemplary implementation of the method shown in FIG. 5.

As indicated above, in one embodiment, the location/time-dependent signal may be a unique wireless signal transmitted from a wireless beacon. For instance, FIG. 6 illustrates a simplified diagram of one embodiment of how the disclosed method 500 may be implemented using wireless beacons. As shown, a wireless beacon 602 may be positioned at point 604 and may be configured to transmit a wireless signal (e.g., a WiFi signal, a Bluetooth signal and/or the like) across a limited distance or range 606. Thus, to receive the wireless signal, both the first and second clients (indicated by points 608 and 610, respectively) must be located within the limited range 606 of the wireless beacon 602. In addition, to ensure that both the first and second clients are located within the beacon's range 606 at the same time, the wireless beacon 602 may be configured to vary the wireless signal over time. For instance, in one embodiment, the wireless beacon may be configured to transmit a unique combination of letters and/or numbers (e.g., a unique combination of a Service Set Identifier (SSID) and a Media Access Control (MAC) address) that changes at a predetermined frequency (e.g., every 30 seconds). Accordingly, if both clients receive the same wireless signal from the wireless beacon 602, it can be assumed that the first and second players were at the same approximate location at the same time.

It should be appreciated that the wireless beacon 602 may generally comprise any suitable wireless transmitter configured to transmit signals using any suitable wireless communications protocol, such as the IEEE 802.11 standard wireless protocol, the Bluetooth standard protocol and/or the like. In addition, it should be appreciated that, in one embodiment, the wireless beacon 602 may be connected to the server via a suitable network (e.g., network 130 of FIG. 1). Thus, data may be transmitted between the server and the wireless beacon. For instance, the wireless beacon may be configured to transmit a copy of the wireless signal to the server each time the signal is changed. However, in an alternative embodiment, the wireless beacon 602 may simply be configured to transmit wireless signals without being connected to the server over a network.

Alternatively, as indicated above, the location/time-dependent signal may be a unique audible signal. For instance, referring to FIG. 6, instead of a wireless beacon 602, a noise source may be located at point 604 that is emanating an audible signal across the limited range 606. Specifically, in one embodiment, the first and second players may both be at the same event (e.g., a concert occurring at point 604). In such an embodiment, the players may take audio recordings of the ambient noise around them using the first and second clients (e.g., by recording the music and/or the crowd at the concert). These audio recordings may then be transmitted to the server and subsequently analyzed (e.g., using any suitable sound recognition algorithm known in the art) to determine if the audio profiles of are the same. If the audio profiles are the same, it can be assumed that the players were at the same proximal location when the recordings were captured.

It should be appreciated that, for purposes of comparing the audio recordings, two audio profiles may be considered to be the same if the profiles are substantially similar. For instance, the background noise of an audio recording taken by one player may be different than the background noise of an audio recording taken by another player, even though both players are located at the same event. Similarly, players may begin to record the same noise event at different times and, thus, only a portion of the audio profiles may be the same. Accordingly, one of ordinary skill in the art should readily appreciate that some variations in the audio profiles may be accommodated While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method comprising:
receiving, by a computer system, a request associated with verifying the proximity of a first player of the location-based game relative to a second player of the location-based game;
storing, by the computer system based on the request, a data record associated with an expiration period;
transmitting, by the computer system, a visual indicator to a first client of the first player, an identifier associated with the data record encoded in the visual indicator;
receiving, by the computer system from a second client of the second player, a first image of the visual indicator captured by a camera of the second client in response to being displayed on a screen of the first client;
identifying, by the computer system, the identifier encoded in the first image of the visual indicator;
determining, by the computer system, whether the first image of the visual indicator has been received from the second client within the expiration period associated with the data record;
verifying, by the computer system, the proximity of the first player to the second player in response to determining that the first image of the visual indicator has been received from the second client within the expiration period;
responsive to verifying the proximity of the first player to the second player within the expiration period, extending, by the computer system, the expiration period associated with the data record by an additional period of time;
receiving, by the computer system from a third client of a third player, a second image of the visual indicator captured by a camera of the third client in response to the visual indicator being displayed by the first client or the second client; and
verifying, by the computer system, the proximity of the third player to the first and second players in response to determining that the second image has been received within the extended expiration period.

2. The method of claim 1, wherein the request was transmitted by the first client and the data record includes a timestamp corresponding to a time at which the request was transmitted by the first client.

3. The method of claim 1, wherein the visual indicator corresponds to a unique QR code.

4. A system for verifying player proximity within a location-based game, the system comprising:
one or more processors; and
one or more non-transitory computer readable storage mediums storing instructions that, when executed by the one or more processors, configure the one or more processors to:

receive a request associated with verifying the proximity of a first player of the location-based game relative to a second player of the location-based game;

store, based on the request, a data record associated with an expiration period;

transmit, to a first client of the first player, a visual indicator, an identifier associated with the data record encoded in the visual indicator;

receive, from a second client of the second player, a first image of the visual indicator captured by a camera of the second client in response to being displayed on a screen of the first client;

identify the identifier encoded in the first image of the visual indicator;

determine whether the first image of the visual indicator has been received from the second client within the expiration period associated with the data record;

verify the proximity of the first player to the second player in response to determining that the first image of the visual indicator has been received from the second client within the expiration period;

responsive to verify the proximity of the first player to the second player within the expiration period, extend the expiration period associated with the data record by an additional period of time;

receive, from a third client of a third player, a second image of the visual indicator captured by a camera of the third client in response to the visual indicator being displayed by the first client or the second client and verify, by the computer system, the proximity of the third player to the first and second players in response to determining that the second image has been received within the extended expiration period.

5. The system of claim 4, wherein the request was transmitted by the first client and the data record includes a timestamp corresponding to a time at which the request was transmitted by the first client.

6. The system of claim 4, wherein the visual indicator corresponds to a unique QR code.

7. The system of claim 4, wherein the first image of the visual indicator corresponds to a photographed copy of the visual indicator.

8. A non-transitory computer readable storage medium storing instructions which when executed by one or more processors cause the one or more processors to perform steps comprising:

receiving a request associated with verifying the proximity of a first player of the location-based game relative to a second player of the location-based game;

storing, based on the request, a data record associated with an expiration period;

transmitting a visual indicator to a first client of the first player, an identifier associated with the data record encoded in the visual indicator;

receiving, from a second client of the second player, a first image of the visual indicator captured by a camera of the second client in response to being displayed on a screen of the first client;

identifying, by the computer system, the identifier encoded in the first image of the visual indicator;

determining whether the first image of the visual indicator has been received from the second client within the expiration period associated with the data record;

verifying the proximity of the first player to the second player in response to determining that the first image of the visual indicator has been received from the second client within the expiration period;

responsive to verifying the proximity of the first player to the second player within the expiration period, extending the expiration period associated with the data record by an additional period of time;

receiving, from a third client of a third player, a second image of the visual indicator captured by a camera of the third client in response to the visual indicator being displayed by the first client or the second client and verifying, by the computer system, the proximity of the third player to the first and second players in response to determining that the second image has been received within the extended expiration period.

9. The method of claim 1, wherein the request is initiated by the first client in response to the first player selecting a button displayed on a user interface of the first client.

10. The method of claim 1, wherein the visual indicator is randomly generated.

* * * * *

UNITED STATES PATENT AND TRADEMARK OFFICE
CERTIFICATE OF CORRECTION

PATENT NO. : 9,604,131 B1
APPLICATION NO. : 13/955110
DATED : March 28, 2017
INVENTOR(S) : Keityh Shoji Kiyohara et al.

It is certified that error appears in the above-identified patent and that said Letters Patent is hereby corrected as shown below:

In the Claims

Column 14, Line(s) 17-18, Claim 1, change "player of the location-based game" to read as –player of a location-based game–

Column 15, Line(s) 30-32, Claim 4, change "second client and verify," to read as –second client; and verify,–

Column 16, Line(s) 6, Claim 8, change "player of the location-based game" to read as –player of a location-based game–

Column 16, Line(s) 33-34, Claim 8, change "second client and verifying," to read as –second client; and verifying,–

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*